United States Patent [19]

Love

[11] Patent Number: 4,818,391
[45] Date of Patent: * Apr. 4, 1989

[54] INTEGRAL CLARIFIER

[76] Inventor: Leonard S. Love, 578 Minette Circle, Mississauga, Ontario, Canada, L5A 3B9

[*] Notice: The portion of the term of this patent subsequent to Mar. 24, 2004 has been disclaimed.

[21] Appl. No.: 536,816

[22] Filed: Sep. 28, 1983

[51] Int. Cl.⁴ .................................................. C02F 3/20
[52] U.S. Cl. .................................. 210/195.3; 210/219; 210/220; 210/521; 210/926
[58] Field of Search ............... 210/626, 627, 628, 220, 210/195.3, 219, 195.4, 522, 521, 926, 194, 199

[56] References Cited

U.S. PATENT DOCUMENTS

| | | | |
|---|---|---|---|
| 1,492,780 | 5/1924 | Davis | 210/538 |
| 3,385,444 | 5/1968 | Dufournet | 210/626 |
| 3,788,477 | 1/1974 | Love | 210/195.4 |
| 3,907,672 | 9/1975 | Milne | 210/626 |
| 4,259,182 | 3/1981 | Belveal | 210/626 |
| 4,272,369 | 6/1981 | Love | 210/195.3 |
| 4,278,547 | 7/1981 | Reid | 210/629 |
| 4,303,517 | 12/1981 | Love et al. | 210/208 |

Primary Examiner—Benoit Castel
Attorney, Agent, or Firm—Rogers, Bereskin & Parr

[57] ABSTRACT

Apparatus for treating waste water by the solids contact aerobic biological treatment process comprises a clarifier and a reaction basin in liquid communication with one another. In one embodiment, the reaction basin has an aerator which also circulates liquid through the clarifier by way of pipes arranged to collect liquid from the surface of the reaction basin and deliver it to a location adjacent a back wall of the clarifier. The clarifier has a bottom wall which slopes towards the reaction basin. Sludge particles in the liquid settle out in the clarifier and liquid discharged from the pipes flushes the settled biological sludge back into the aeration section of the reaction basin. In another embodiment the clarifier and reaction basin together form an oxidation ditch defining a closed loop. An aeration device continuously circulates liquid around the loop and through the clarifier.

15 Claims, 8 Drawing Sheets

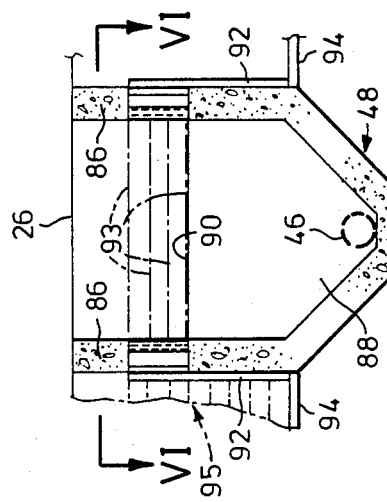
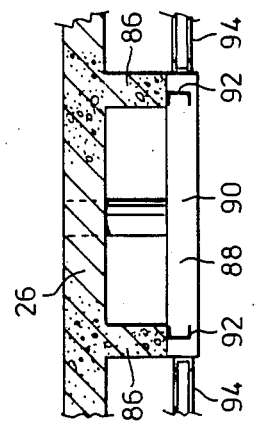
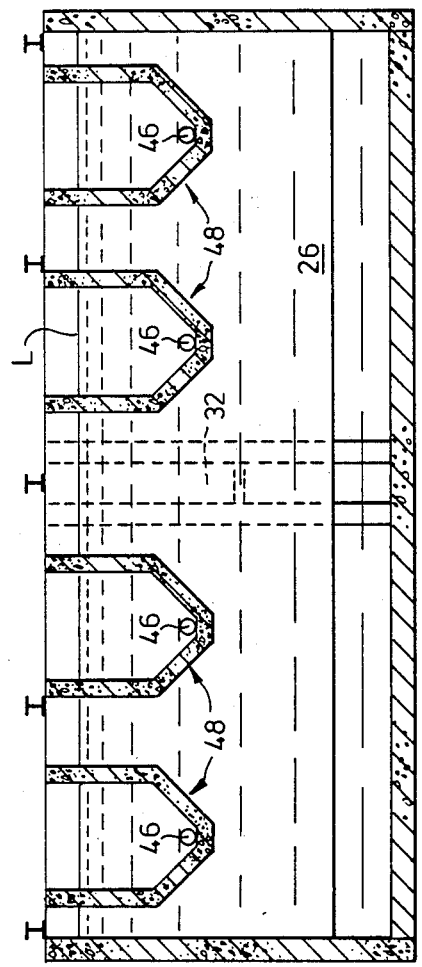
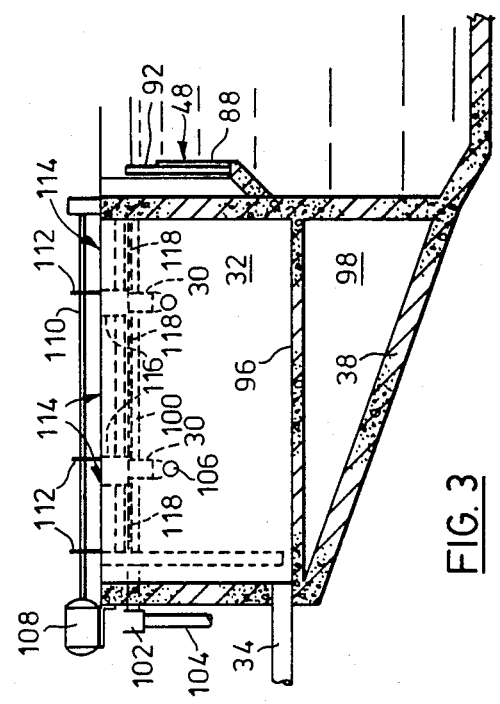

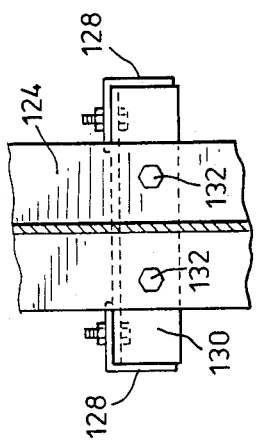
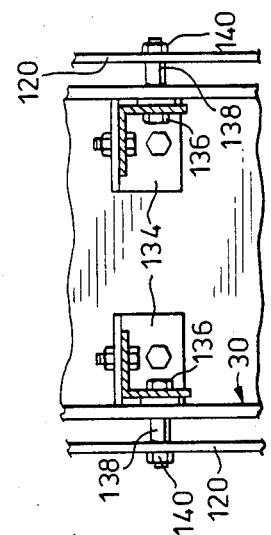
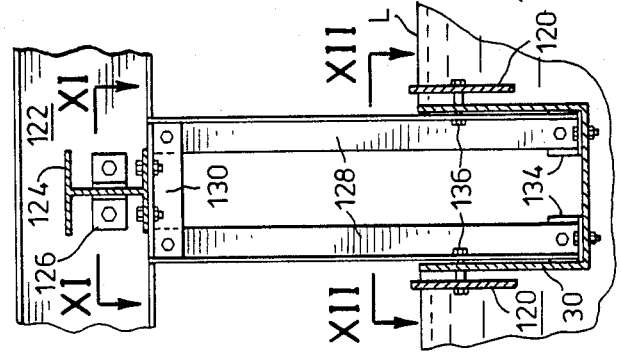
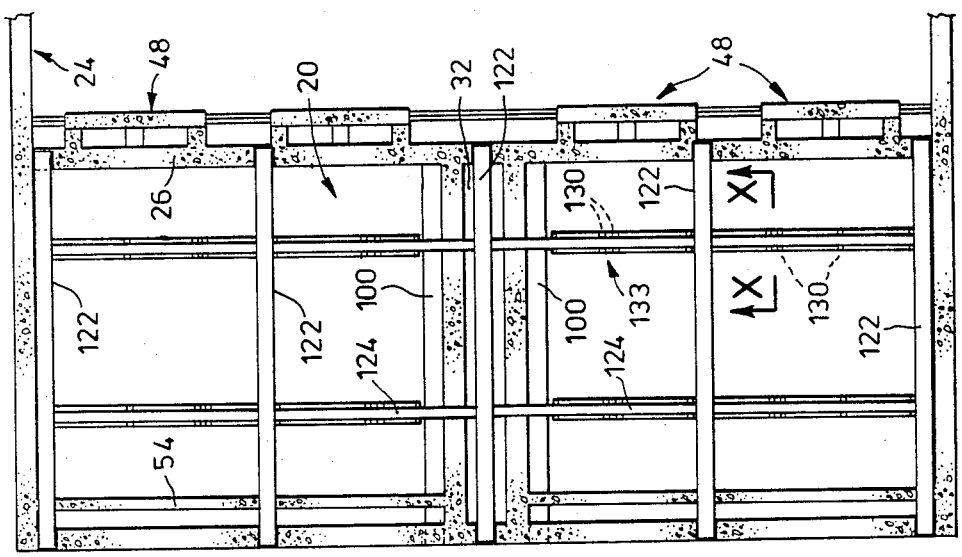

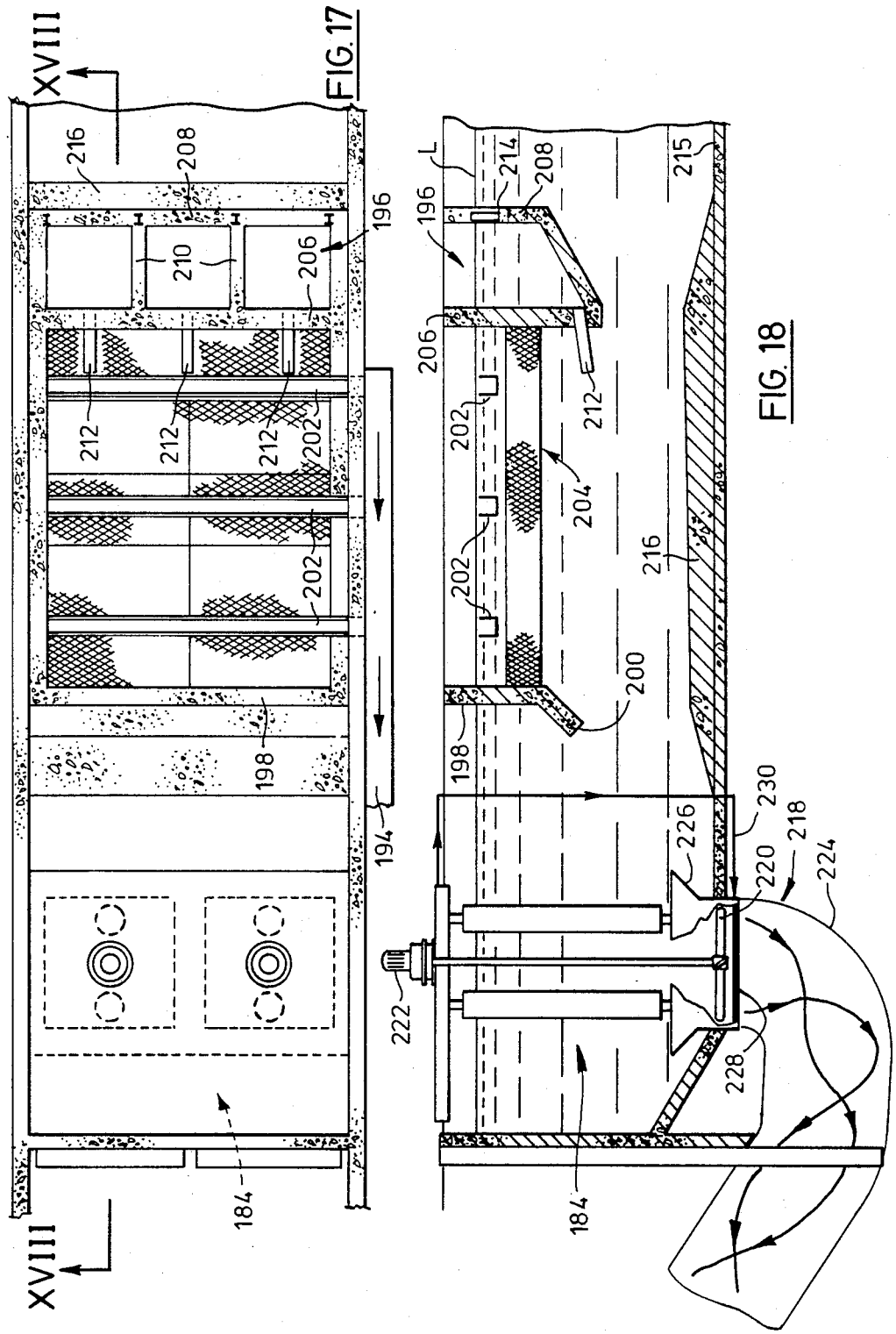

INTEGRAL CLARIFIER

FIELD OF THE INVENTION

This invention relates generally to apparatus for treating liquids such as municipal sewage and industrial waste water by solids contact aerobic biological treatment processes; however, the apparatus provided by the invention may be used for other chemical processes as will be explained later.

BACKGROUND OF THE INVENTION

In the aerobic biological sludge treatment of waste water, mirco-organisms (called bacteria) are encouraged to feed on organic material in the waste water in the presence of oxygen (air). The products of this process are carbon dioxide, water, and additional bacteria. Since this process requires oxygen, it is usually carried out in a vessel called a reaction basin, where the mixture of waste water and bacteria are aerated. After aeration, the sludge mass (bacteria) are separated from the waste water by settling in a device called a clarifier. The purified waste water is discharged as treated effluent while some of the activated sludge is recycled back to the reaction basin for re-use.

DESCRIPTION OF THE PRIOR ART

U.S. Pat. No. 3,788,477 issued Jan. 29, 1974 to Leonard Sydney Love discloses an apparatus of this type in which the clarifier and reaction basin are combined together as an integral unit; this apparatus has come to be known as an "integral clarifier". In the patented apparatus, the clarifier and reaction basin are separated by baffles and a mechanical agitator (aerator) in the reaction basin causes liquid to flow over one of the baffles into the clarifier and to return from the clarifier below the baffle. The clarifier has a sloping bottom wall on which suspended particles settle from the liquid to form a biological sludge. A mechanical sludge scraper assembly periodically scrapes the bottom wall of the clarifier to dislodge the sludge and thereby encourage the sludge to return to the reaction basin.

The Love patent discusses the significant advantages which can be obtained from an integral clarifier construction and in fact clarifiers of the form disclosed in the patent have found wide commercial success. In one of its aspects, the present invention is aimed at providing various improvements in apparatus of the general type disclosed in the Love patent.

A principal one of these improvements is intended to avoid the need for a mechanical sludge scraper assembly for removing settled sludge from the sloping bottom surface of the clarifier. This part of the apparatus has been found to require significant maintenance in practice. Freezing problems have also been encountered where the clarifier is used in cold climates because the mechanical agitator works as quite an efficient heat exchanger which results in a layer of ice forming on the surface of the liquid in the clarifier; in turn, the ice impedes operation of the sludge scraper.

Other objectives of the invention are aimed at providing for more effective clarification of the liquid being treated. This is particularly important where low strength liquids are being treated (e.g. 200 mg. of B.O.D. (biochemical oxygen demand) per liter of liquid). Low strength liquids require a clarifier of relatively large surface area in relation to the surface area of the reaction basin as compared with higher strength liquids. The Love patent discusses the fact that two or even more clarifiers can be provided in association with a single aeration basin in cases such as this but this solution involves substantial additional capital investment. Less costly ways of providing additional clarification capacity would therefore be desirable.

Another aspect of the invention is concerned with an aerobic biological reactor of the type known as an "oxidation ditch". An aeration basin used in the solids contact aerobic biological treatment process may take on a number of different forms and geometric shapes. The oxidation ditch is one such form that has become popular in recent years. An oxidation ditch as an aerobic biological reactor is essentially a closed loop, open channel in which the liquid to be treated (a mixture of waste water and biological solids containing a high concentration of bacteria usually called "mixed liquor"), is aerated and circulated around a loop by an aeration device. Various forms of aeration device have been proposed. In the original oxidation ditch design, rotating brushes known as Kessener brushes were used to aerate the mixed liquor and drive it around the ditch at a speed sufficient to maintain all biological solids in suspension (typically about 1 foot per second).

Typically, the closed loop of the oxidation ditch is formed by a concrete tank (or earthen basin) which, in the case of a shallow ditch may be 4 to 6 feet deep and have side walls which slope at about 45°. Deeper oxidation ditches are 10 to 12 feet deep and have vertical walls. An example of an existing oxidation ditch system is known as the "Total Barrier Oxidation Ditch System" available from Innova-Tech Inc. of Valley Forge, Penna, U.S.A. U.S. Pats. Nos. 4,260,486; 4,278,547; and 4,394,268; all issued to John H. Reid relate to this system.

The prior art identified above illustrates prior proposals for employing clarifiers in an oxidation ditch. Typically, in a conventional oxidation ditch, a portion of the mixed liquor is pumped from the ditch to a separate clarifier. The clarified mixed liquor discharged from the clarifier forms the plant effluent while a portion of the settled biological sludge is recycled back to the oxidation ditch to maintain the proper level of biological activity and treatment efficiency. In these systems, the clarifier is essentially a separate plant component which, although associated with the oxidation ditch, requires pumps and related equipment to convey mixed liquor from the ditch to the clarifier and return the biological sludge from the clarifier.

The present invention is also concerned with the application of an integral clarifier in an oxidation ditch aerobic biological system.

SUMMARY OF THE INVENTION

Broadly considered, the apparatus provided by the invention comprises a clarifier and a reaction basin in liquid communication with one another and together adapted to contain a body of liquid to be treated. Inlet and outlet means are provided respectively for conducting influent liquid to the body of liquid and for removing treated liquid from the clarifier. The apparatus also includes first and second means providing said liquid communication between the clarifier and the reaction basin. The first said means is arranged to permit liquid and sludge to flow from the clarifier into the reaction basin. The second said means is arranged to conduct liquid from the reaction basin to the clarifier and includes at least one liquid conduit having an inlet adjacent the surface of the liquid in the reaction basin and an outlet disposed at a location in the clarifier remote from the reaction basin and arranged to cause liquid leaving the outlet to flow through the clarifier towards the reaction basin to thereby direct settled sludge into the reaction basin. Mixer means is provided in the reaction basin and is adapted to circulate liquid in the basin in a circulation pattern which includes flow components directed away from said first means providing liquid communication and towards said second means, thereby causing said circulation of liquid through the clarifier.

According to the first aspect of the invention, the clarifier has a bottom wall which slopes downwardly from an upper end to a lower end for promoting movement towards said lower end of sludge which has settled from the liquid in the clarifier. The said first means providing liquid communication between the clarifier and the reaction basin is disposed at the lower end of the clarifier bottom wall and the liquid conduit outlet of the second said means is disposed in the region of the upper end of the clarifier bottom wall so that liquid leaving the outlet flushes settled sludge into the reaction basin.

By directing liquid entering the clarifier from the reaction basin to the region of the upper end of the sloping bottom wall of the clarifier it is believed that the need for a mechanical sludge scraper assembly can be avoided. This not only reduces the capital cost of the apparatus but also allows the apparatus to operate unaffected by ice cover on the surface of the liquid. The mixer means may take the form of a mechanical aerator at the surface of the liquid but this too can be eliminated, for example, by the provision of a diffused air or other mixing system within the reaction basin.

In this aspect of the invention, the reaction basin and the clarifier may each be of rectangular shape in plan and are preferably constructed as an integral unit with the reaction basin and clarifier separated by a common wall. The said second means providing liquid communication between the reaction basin and clarifier can then take the form of a series of liquid collectors distributed along the reaction basin side of the common wall to provide for good flow distribution, and a corresponding series of pipes extending through the wall from the collectors and arranged with outer ends of the pipes in the region of the upper end of the sloping wall of the clarifier.

In accordance with a second aspect of the invention, the clarifier and reaction basin together form an oxidation ditch defining a closed loop around which liquid is continuously circulated. The liquid flows through the clarifier during circulation by way of the said first and second means providing liquid communication between the clarifier and the reaction basin. In this case, the mixer device is adapted to aerate the liquid.

Another feature of the invention involves the provision of tube settlers in the clarifier, for the purpose of improving efficiency of clarification.

BRIEF DESCRIPTION OF DRAWINGS

In order that the invention may be more clearly understood, reference will now be made to the accompanying drawings which illustrate a number of preferred embodiments of the invention by way of example, and in which:

FIG. 3 is a partial sectional view on line III—III of FIG. 2;

FIG. 4 is a vertical sectional view on line IV-IV of FIG. 2;

FIG. 5 is a partial elevational view in the direction of the arrows denoted V—V in FIG. 2;

FIG. 6 is a horizontal sectional view on line VI—VI of FIG. 5;

FIG. 9 is a plan view of part of FIG. 2 with some parts omitted;

FIG. 10 is a vertical sectional view on line X—X of FIG. 9;

FIGS. 11 and 12 are horizontal sectional views on lines XI—XI and XII—XII respectively of FIG. 10;

FIG. 17 is an enlarged view part of FIG. 16; and,

FIG. 18 is a longitudinal sectional view on line XVIII—XVIII of FIG. 17.

DESCRIPTION OF THE PREFERRED EMBODIMENTS

In describing the drawings, the term "integral clarifier" will sometimes be used to refer to the treatment apparatus as a whole in accordance with normal terminology in the art, it being understood the principal components of the integral clarifier are a clarifier and a reaction basin. In the claims, the more general term "treatment apparatus" will be used in recognition of the somewhat broader application of the invention in principle.

Figure 1:
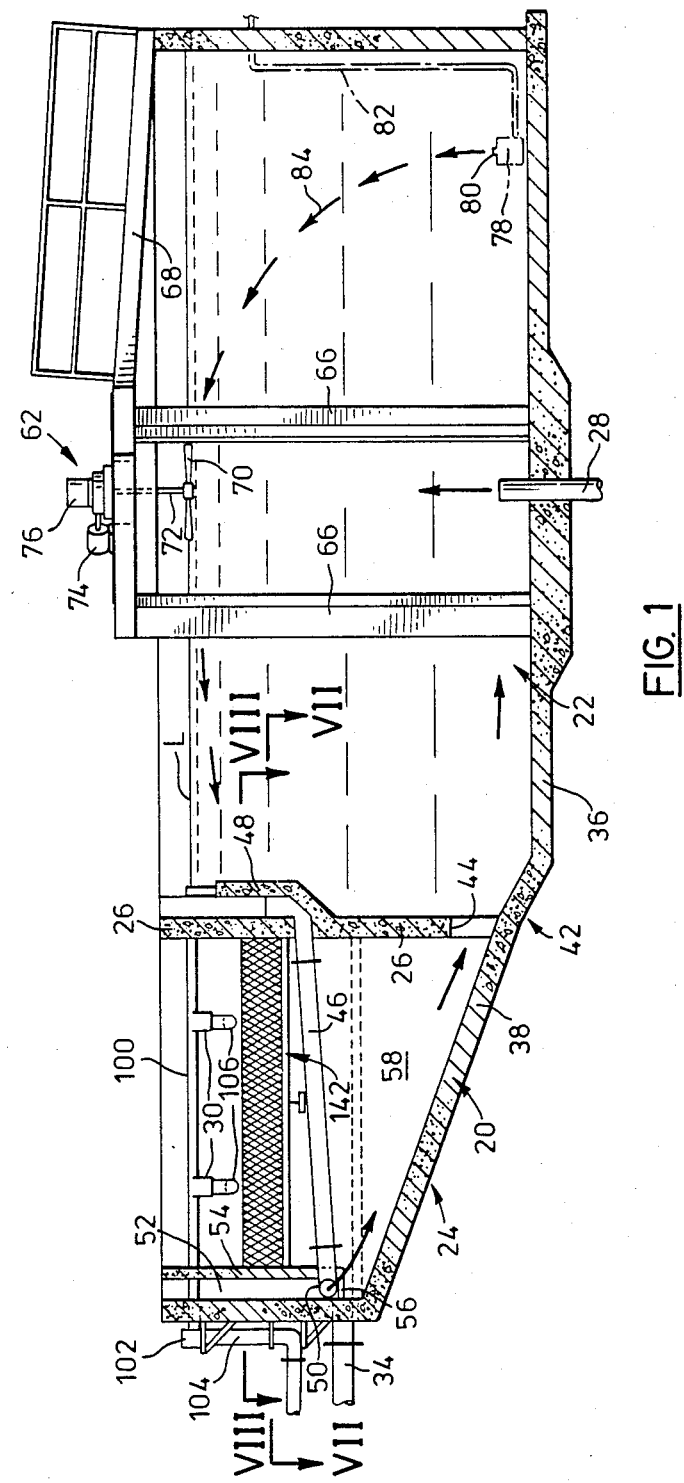
FIGS. 1 and 2 are a vertical sectional view and a plan view respectively of an integral clarifier according to one aspect of the invention, the sectional view of FIG. 1 being taken on the stepped section line denoted I—I of FIG. 2.
Figure 2:
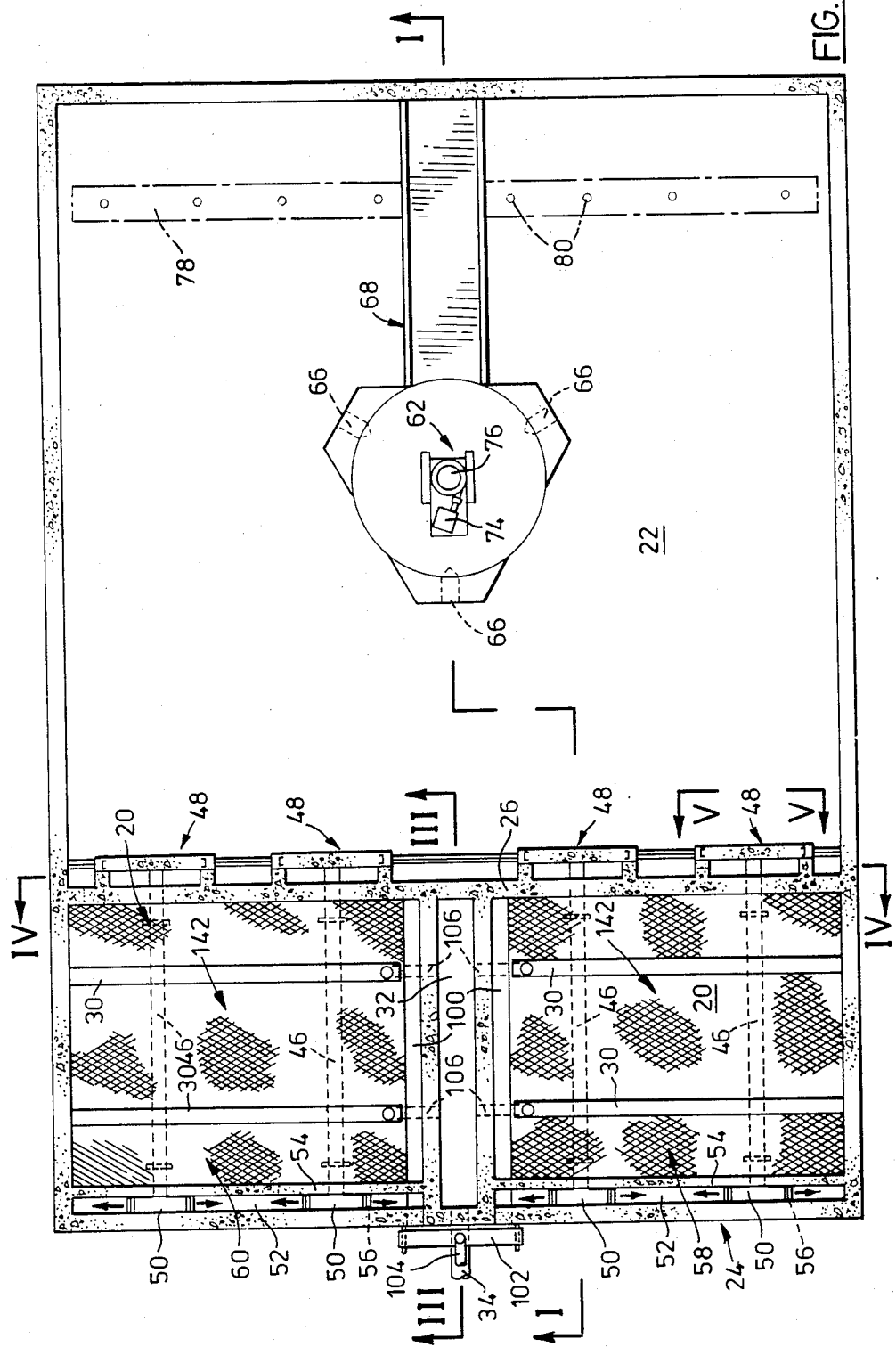

Referring first to FIGS. 1 and 2, the integral clarifier is shown to comprise a clarifier 20 and a reaction basin 22 both of rectangular shape in plan (FIG. 2). The clarifier and reaction basin are defined by what is essentially a large rectangular concrete tank 24 having a transverse wall 26 which divides the tank into a clarifier 20 and reaction basin 22. Liquid to be treated is shown extending in the tank to a level denoted L. Influent liquid to be treated is delivered to the tank through an inlet pipe 28 (FIG. 1) which is disposed in a vertical position generally centrally of the reaction basin 22. Treated liquid leaves the clarifier through launders generally denoted by reference numeral 30 from where it passes to a collection chamber 32 (FIG. 2) before flowing out of the tank by way of a main water outlet pipe 34.

It will be seen from FIG. 2 that the reaction basin 22 is in fact generally square in plan while the clarifier 20 is of somewhat narrower rectangular shape and of a length equal to the length of one side of the reaction basin and arranged to extend along that side. The reaction basin has a generally flat bottom wall 36 (FIG. 1) but the clarifier has a bottom wall 38 which slopes downwardly from an upper end 40 adjacent one of the outer side walls of tank 24 to a lower end 42 adjacent the reaction basin 22. The slope of clarifier bottom wall 38 is continued over the entire length of the clarifier (top to bottom in FIG. 2). As will be more particularly described later, particles which settle out of the liquid being treated will collect as biological sludge and will be returned to the reaction basin under the combined effects of gravity and the flushing action of the liquid flow in the clarifier (to be described) but without the need for mechanical intervention. In this particular embodiment, the inclination of wall 38 is approximately 20° to the horizontal although the particular angle selected will vary with other dimensions of the apparatus and the nature of the liquid being treated.

Clarifier 20 and reaction basin 22 are in liquid communication with one another through the common wall 26 of tank 24. At the bottom end of wall 26 an opening 44 is provided to allow liquid and sludge to flow from the clarifier into the reaction, basin when the apparatus is in operation. Opening 44 extends over the entire length of the wall except in the region of chamber 32. Liquid can also flow from the reaction basin to the clarifier by way of a series of pipes 46 which extend through wall 26 from associated liquid collectors 48 at the reaction basin side of wall 26, to positions in the region of the upper end 40 of the clarifier bottom wall 38. As can best be seen in FIG. 2, in this embodiment, there are in fact four such pipes 46 each having an associated liquid collector 48. The collectors are shown in more detail in FIGS. 4, 5 and 6 which will be described later. For present purposes, it is sufficient to note that the pipes and collectors are distributed along wall 26 with the object of ensuring substantially uniform collection of water from the reaction basin along the length of the wall.

At their outer ends (adjacent the side wall of tank 24) each pipe 46 is provided with a T-shaped outlet fitting 50 (FIG. 2) through which liquid issues outwardly in opposite directions in use as indicated by the arrows in FIG. 2. The fittings 50 on the respective pipes 46 are in fact located with the horizontal limbs of the Ts (through which water issues in use) located within a narrow vertical chamber 52 defined between the outer wall of tank 24 and a thinner inner wall or baffle 54 as best seen in FIG. 1. Chamber 52 is open at the top to provide access for maintenance and back flushing if required. Brackets 56 extend across the bottom of the chamber and support the fittings 50. When the apparatus is in use, water issuing from the fittings 50 tends to be distributed laterally through the chamber and to issue downwardly as a curtain onto the clarifier bottom wall 38, flushing sludge which has settled from the liquid in the clarifier, into the reaction basin. It is expected that the flow of liquid from the pipes 46 will be substantial and will exert quite a vigorous flushing effect. By way of example, the volume of water flowing through the pipes may be five times the volume of liquid being treated (e.g. 5,000,000 gallons per day for an apparatus capable of treating 1,000,000 gallons per day).

In the particular embodiment illustrated, it will be noted that the clarified water collection chamber 32 in effect divides the clarifier into two identical settling chambers denoted 58 and 60 on respectively opposite sides of the collecting chamber 32. However, since the two settling chambers 58 and 60 are essentially identical, they may effectively be considered as a single chamber and will be described as such in the present application.

Located generally centrally of the reaction basin 22 vertically above the liquid inlet 28 (FIG. 1) is a mechanical aerator 62 which is supported on a platform 64 by way of vertical columns 66 in tank 24. An access walkway for maintenance purposes is indicated at 68. Aerator 62 is essentially of conventional construction and comprises an impeller 70 which is partially submerged in liquid in tank 24 for rotation about a vertical axis defined by a drive shaft 72. An electric motor 74 drives shaft 72 by way of a gear box 76. Aerator 62 is arranged to produce a liquid circulation pattern in the reaction basin in which the liquid flows generally radially outwardly from the impeller at the top of the basin towards the outer wall, and then down the side walls and back inwardly along the bottom of the basin before being drawn vertically upwardly in the center region of the basin. As a result of this pattern, some of the liquid which is directed towards the wall 26 between the aeration basin and the clarifier will enter the collectors and flow through the pipes 46 to the outer wall of the claifier as discussed previously. At the same time, impeller 70 will tend to draw liquid back into the aeration basin through the opening 44 at the bottom of wall 26. In other words, aerator 62 will not only tend to perform its normal function of aerating the liquid in a reaction basin 22 but will also serve to circulate the liquid through the clarifier as described previously.

It might be appropriate at this stage to recall that the conventional solids contact aerobic biological treatment process of waste water treatment requires aeration to encourage micro-organisms (called bacteria) to feed on organic material in the waste water. The products of the process are carbon dioxide, water and additional micro-organisms or bacteria. In the apparatus as provided by the present invention, this process is carried out in the reaction basin 22. After aeration, the water, with the biological solids (bacteria) in suspension, is conducted into the clarifier 20 where the solid particles settle from the water by gravity. The clarified water is discharged from the clarifier by way of the collection chamber 32 and the biological sludge is recycled back to the reaction basin as described previously. Aerator 62 serves not only to perform the required aeration function but also causes the liquid and suspended biological solids to be conducted through the clarifier.

It should be noted that the invention does not essentially require the use of a mechanical aerator; other forms of mixing device could be used. For example, FIGS. 1 and 2 show in ghost outline a diffused air mixing system which may be used as an alternative to the mechanical aerator 62. As shown, the system includes a diffuser 78 which is submerged in and extends across the reaction basin adjacent the side wall of tank 24 remote from clarifier 20. The diffuser has a series of air outlets indicated at 80 in FIG. 2 which are spaced along the diffuser and an air supply is shown at 82. In use, air issues upwardly from the openings 80 in a flow pattern somewhat similar to that represented by the ghost outline arrows 84. The circulation pattern will of course be somewhat different from that provided by the mechanical aerator 62 but will still have the effect of both aerating the liquid within basin 22 and circulating the liquid through the clarifier.

In this embodiment, provision is made to control the flow of liquid into the clarifier from the aeration basin by controlling the amount of water entering the water collectors 48. FIGS. 4, 5 and 6 show the collectors in some detail and it will be seen that each collector 48 essentially takes the form of a vertical tube or "chimney" with a funnel-shaped lower end. The collectors are cast in concrete and each has a pair of side walls 86 which extend down from the top surface of tank 24 below the water level L and then converge and meet just below the location of the associated pipe 46. Each chimney also has a front wall 88 (FIG. 5) which is of somewhat less height than the side walls 86 and which terminates at a horizontal top face 90 below the anticipated water level L in the reaction basin 22. Secured to the exposed faces of the side walls 86 above the front wall 88 are a pair of vertical inwardly facing metal channels 92 designed to slidably receive so-called "stop logs" used to control the flow of water into the collector. Typically, these stop logs will take the form of 1½" thick cedar planks of a length selected to fit between the channels 92 and of a width appropriate to the incremental amount by which the effective level of the front wall 88 is required to be adjustable. In the drawings, three typical stop logs have been indicated in ghost outline at 93 and it will be understood that, by appropriately selecting the width and number of stop logs used in each collector, the liquid flow into that collector and differential flows from collector to collector can be adjusted according to the flow conditions required in the clarifier 20.

Additional control is provided for by arranging for stop logs to be used between the collectors 48 also. FIGS. 5 and 6 show vertical channels 92 and upwardly facing horizontal channels 94 which are provided respectively on the outer side faces on the front wall 88 of each collector 48 and between adjacent collectors so that stop logs generally indicated in ghost outline at 95 may additionally be used in the spaces between the collectors in similar fashion to the stop logs used in the collectors themselves. One of these vertical channels 92 is also visible in FIG. 3 which is a vertical sectional view through the center of the clarifier at the position of the collecting chamber 32.

FIG. 3 also illustrates the fact that collection chamber has a horizontal bottom wall 96 above the sloping clarifier bottom wall and that the space between the two walls is packed with fill 98.

Referring back to FIG. 1, the launders 30 through which clarified liquid is removed from the clarifier are arranged in pairs on opposite sides of the collecting chamber 32. Each pair extends outwardly from the collecting chamber lengthwise of the clarifier to the outer wall of tank 24 to provide uniform collection of treated water over the entire clarifier surface. Interposed between the inner ends of the launders 30 and the walls of the collecting chamber are a pair of scum collecting troughs 100 which extend transversely of the clarifier normal to the launders (see FIG. 2). These troughs extend through the concrete wall of tank 24 to a header 102 which connects the two troughs externally of tank 24 and which is provided with a scum removal pipe 104 (see FIG. 3). The launders 30 are connected to the collecting chamber 32 by respective pipes 106 which extend below the scum troughs 100.

FIG. 3 also illustrates (in diagrammatic form only) a scum scraper assembly which is used to remove scum accumulating on the surface of the liquid in the clarifier and deliver it into the troughs 100. Two such assemblies will of course be provided, one on each side of the collecting chamber 32 and will extend between the relevant scum trough and the outer wall of tank 24. The scum scrapers will travel in the direction of the lengths of the launders 30 and will be operable at appropriate times to scrape the scum into the troughs.

As shown in FIG. 3, the scum scraper assembly comprises an electric motor 108 which is supported from the side wall of tank 24 and which has a driven shaft 110 extending across substantially the full width of the clarifier parallel to the troughs 100. Driven from shaft 110 by chain and sprocket drives diagrammatically indicated at 112 are three chain scraper assemblies 114 for scraping respectively the area between the two launders 30 and the two areas outwardly of the launders. Referring to the center scraper assembly by way of example, each assesmbly 114 comprises a pair of endless chains 116 each extending around a pair of sprockets positioned one adjacent the relevant scum collector trough 100 and the other adjacent the outer wall of tank 24. Scum scraper blades 118 extend between the chains 116 generally parallel to the trough 100 at a height such that their lower edges just brush the surface of the liquid when motor 108 is operated. The scum scraper assemblies are arranged so that the lower runs of the chains 116 travel towards the relevant trough 100 when motor 108 is operated. As indicated previously, similar scum scrapers are provided on both sides of the collecting chamber 32 so that substantially the entire surface area of the clarifier between and outwardly of the launders 30 is covered by the scum scrapers.

In summary, the scum scrapers scrape scum which collects on the surface of the liquid in clarifier 20 inwardly towards the scum collection troughs 100 from both sides. The scraper assemblies operate between and outwardly of the launders 30 and cover substantially the entire surface area of the clarifier. The scraper assemblies in themselves are of essentially conventional structure and therefore have not been described and illustrated in detail.

Scum is prevented from entering the launders by scum baffles 120 which extend along both sides of each launder. The baffles are not shown in FIGS. 1 and 3 but two typical such baffles do appear in FIG. 10. That view may be considered to be a typical longitudinal sectional view through one of the launders 30 although the section line represented by FIG. 10 is specifically shown as section X—X in FIG. 9. FIG. 9 itself is a plan view of the clarifier part of the apparatus and may be considered as being equivalent to the part of FIG. 2 which appears at the left but showing the support members for the launders; for clarity of illustration, those members have been omitted from FIG. 2.

Referring first to FIG. 10, the launder itself is designated 30 and essentially comprises a U-section metal channel. Top edges of the side limbs of the channel define the liquid level L in the clarifier. Respective scum baffles 120 are provided on outwardly of those limbs. Each baffle simply comprises a flat metal plate which extends parallel to the side limb of the channel and which has a top edge positioned slightly above the water level L so as to hold back scum which might otherwise flow into the launder.

The clarifier includes a launder support system comprising main structural I-beams 122 and secondary I-beams 124. The beams 122 transversely span the clarifier with their ends supported on the outer side wall of tank 24 and on wall 26. The I-beams 124, one of which is shown in section in FIG. 10, extend longitudinally of the clarifier and are bolted to the main support beams 122 by angle brackets 126.

Launders 30 are suspended directly below the beams 124 by vertical hangers 128 (FIG. 10) which depend from the longitudinal beams 124 at positions appropriately spaced therealong. FIG. 11 illustrates the fact that the hangers 128 are formed by angle section members bolted at their upper ends to a transverse angle member 30 which is in turn secured to the appropriate longitudinal member 124 by bolts 132. It will be seen from FIG. 9 that, at some locations along the beams 124, the angle members 130 are arranged in pairs, each carrying two hangers. A typical such location is denoted by reference numeral 133 and occurs at the junction between abutting channel members forming the launders 30. Angle brackets 134 (FIGS. 10 and 12) are bolted to the lower ends of the hangers 128 and to the base of these channel members. In addition, each hanger is bolted to the side wall of the channel by bolts 136 which extend outwardly through the hanger and channel member and which are also used to carry the scum baffles 120. Thus, each bolt 136 is provided, outwardly of the relevant channel member with a spacer sleeve 138 against the outer end of which the scum baffle 120 bears. A retaining nut 140 is then provided at the outer surface of the baffle.

Returning to a consideration of FIG. 1, it will be remembered that water is continuously entering clarifier 20 from the reaction basin 22 at a controlled rate and activated sludge and some of the water is continuously returning to the aeration basin through opening 44 in wall 26. At the same time, clarified water is continuously being removed from the clarifier through pipe 34. Flow conditions within the clarifier are carefully controlled to provide relatively quiescent settling conditions for permitting suspended particles within the water to settle out by gravity. At the same time, a gentle upward flow of liquid takes place in the clarifier towards the launders 30 as the clarified water is withdrawn through pipe 34. Heavier suspended particles settle out in clarifier 20 while lighter particles are carried upwardly towards the launders.

In accordance with a further feature of the invention, the settling efficiency of the clarifier is improved as compared with existing clarifiers by the addition of an array of tube settlers generally denoted 142 below the launders 30. In FIG. 2, the settlers are generally indicated by cross-hatched areas, some of which are denoted 142 but it is to be noted that the array of tube settlers covers the entire surface area of the clarifier with the exception of chambers 52 and 32. Tube settlers are well-known in principle and are discussed in the patent literature. An early example of a tube settler is shown in U.S. Pat. No. 367,308 (McNab and McNab). Essentially, tube settlers comprise an array of tubes arranged with their axes inclined to the horizontal. As liquid containing suspended particles rises vertically into the lower ends of the tubes in travelling towards the launders, suspended particles in the liquid come into contact with upper surfaces of the tubes which causes certain of those particles to fall downwardly onto the opposing lower surfaces where the particles collect. Eventually, the mass of particles reaches a size at which it can no longer be sustained within the tube and the mass will slide down the tube and "slough off" back into the liquid. At this time, the mass will also be sufficiently large that it will settle out of the liquid.

Generally, tube settlers have not, however, been used in liquids containing organic matter because of the problem that colonies of micro-organisms tend to grow where the particles collect in the tubes with the result that the tubes eventually become blocked by these colonies. Conventional thinking has been that the diameters of the tubes must be kept relatively small for proper settling but this has been incompatible with the problem with microbiological growth. As a result, tube settlers have not found wide application in activated sludge treatment processes.

However, it has been found that this problem of microbiological growth can in fact be avoided if the tubes are appropriately diamensioned internally within a range selected to provide for proper settling while at the same time avoiding plugging of the tubes by colonies of micro-organisms. Tube settlers meeting these criteria form the subject of U.S. patent application Ser. No. 510,140 filed July 1, 1983 for IMPROVEMENTS RELATING TO TUBE SETTLERS by Leonard Sydney Love, now abandoned. Preferably, the tube settlers employed in the apparatus of the present invention are of the form disclosed in that patent application.

Figure 8:
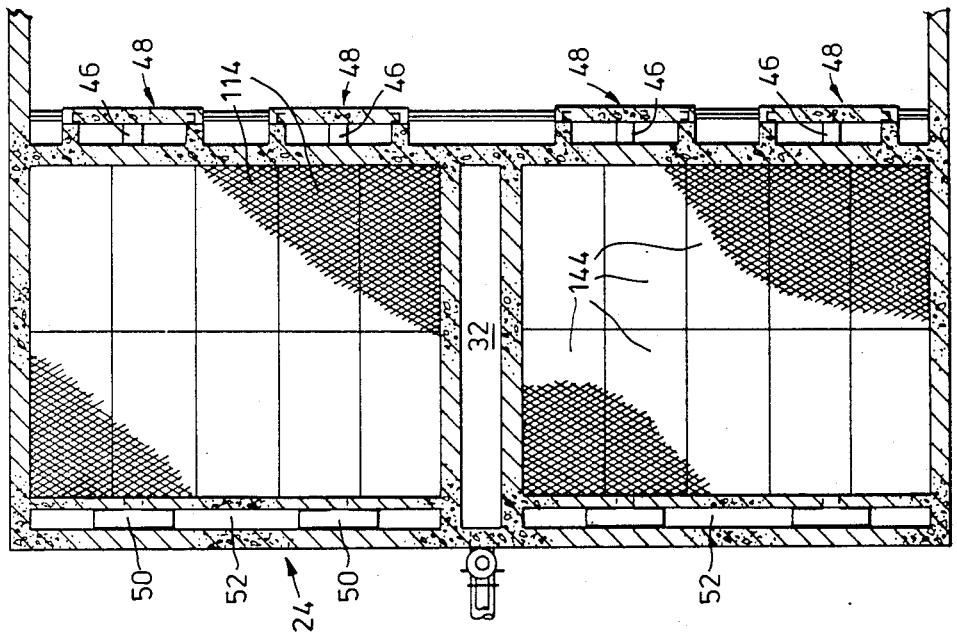
FIGS. 7 and 8 are horizontal sectional views on lines VII—VII and VIII—VIII respectively of FIG. 1.

Tube settlers of this and other designs in modern day usage are typically manufactured as standard size blocks or bundles of plastic tubes; typically the blocks are $2' \times 4' \times 8'$. FIG. 8 of the drawings shows the tube settler array 142 in plan and may be considered to be a plan view corresponding to the clarifier portion of the apparatus shown in FIG. 1 but with the launders and scum collector troughs removed. The individual blocks of tube settlers are denoted by reference numeral 144 and it will be seen that the blocks are arranged in tightly packed rows covering the entire surface area of the clarifier. The clarifier in turn is sized to receive the blocks, preferably without the need for cutting the blocks. In the illustrated embodiment, each clarifier section 58 and 60 is sized so that its internal dimensions excluding chamber 52 are 20' long by 16' wide.

Figure 7:
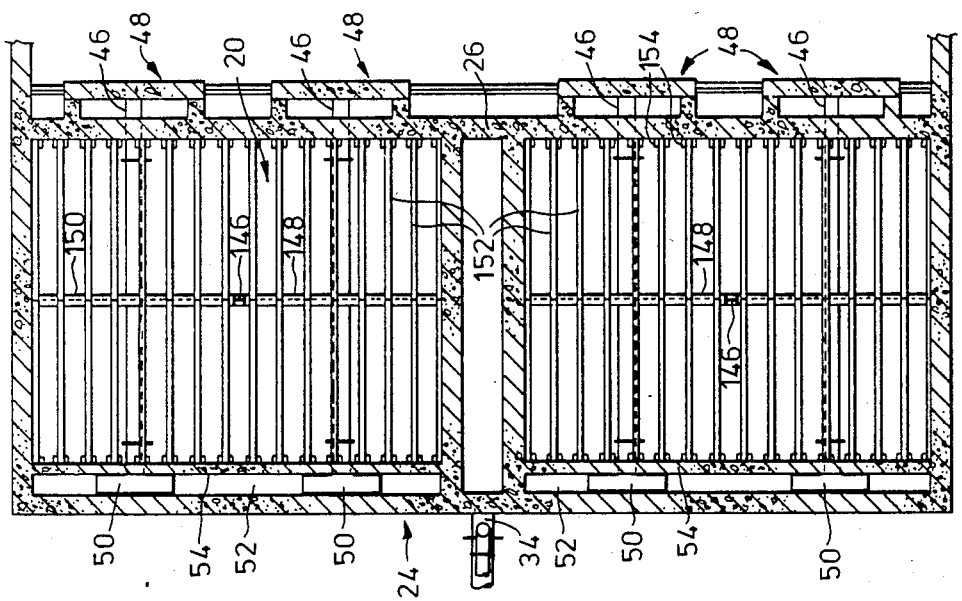

FIG. 7 shows the support structure for the tube settler bundles. A vertical column 146 extends up from the floor of the clarifier substantially in the center of each section 58, 60 and supports a pair of horizontal I beams 148 which are bolted to the column at their inner ends and secured to the walls of tank 24 by angle brackets 150 at their outer ends. These beams 148 in turn serve as supports for inverted channel members 152 which extend outwardly from opposite sides of the beams 148 to the tank walls 54 and 26 respectively. At their inner ends, the members 152 rest on and are welded to the beams 148 (see also FIG. 1) while at their outer ends, the channels are welded to angle brackets 154 at the respective walls. The tube settler bundles are simply laid on the bases of the members 152 and will not normally require securing to the members. However, if necessary, tie-down bars or other securing means (not shown) can be used.

Figure 14:
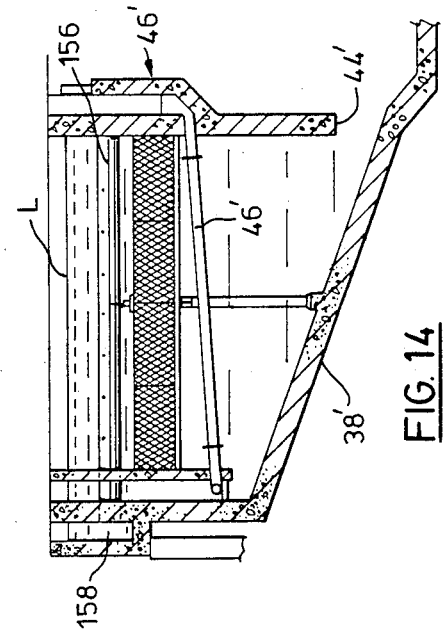
FIGS. 14 and 15 are vertical sectional views on lines XIV—XIV and XV—XV respectively of FIG. 13.
Figure 15:
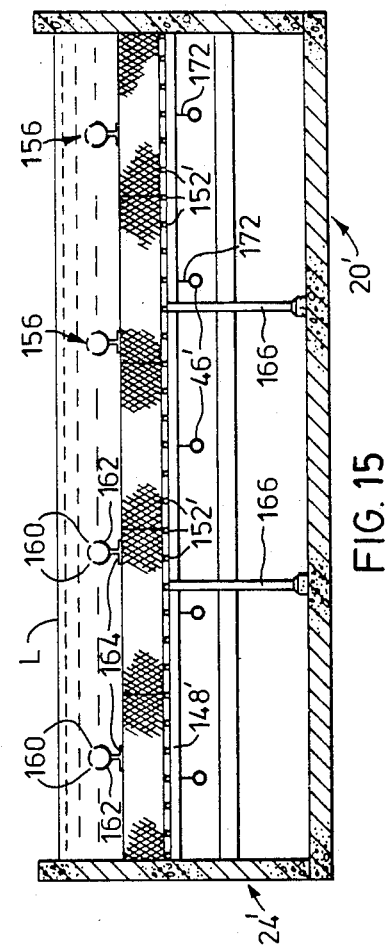
Figure 13:
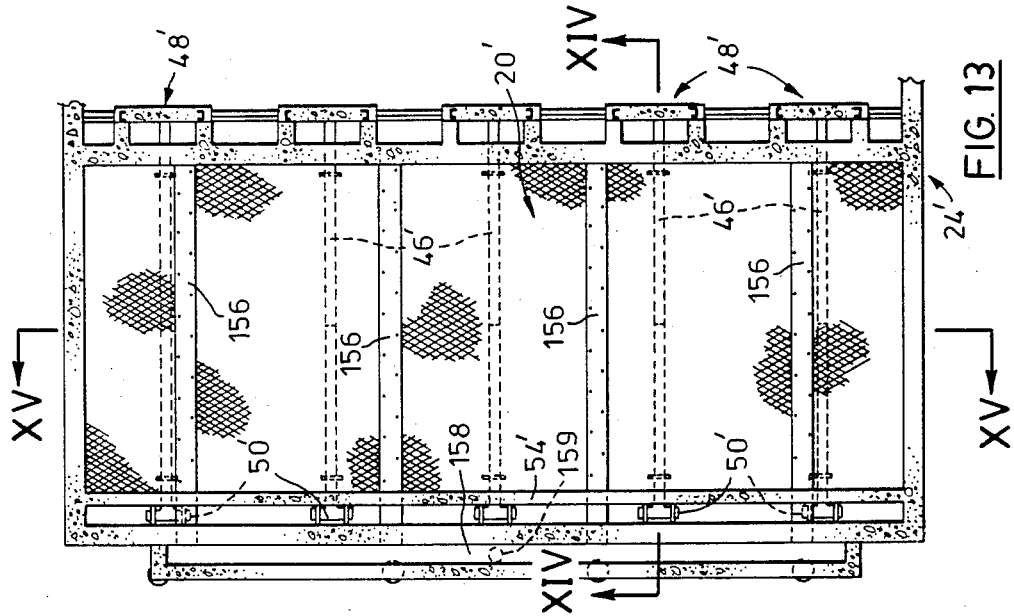
FIG. 13 is a plan view corresponding to part of FIG. 2 showing an alternative embodiment.

FIGS. 13, 14 and 15 illustrate an alternative embodiment of the invention and will now be described; primed reference numerals have been used in these views to denote the parts which correspond with parts shown in previous views.

The principal feature of the embodiment of FIGS. 13 to 15 is that the launders 30 of the preceding embodiment have been replaced by submerged launders denoted 156 which extend transversely of the clarifier 20' (i.e. at right angles to the direction of the launders 30). As a result, the clarified liquid collection chamber 32 is no longer required at the center of the clarifier and the clarifier essentially comprises a single tank. Instead of chamber 32, a longitudinal collecting chamber 158 extends outwardly of the outer wall of tank 24 and the submerged launders 156 feed into that chamber. Chamber 158 in turn has a main water outlet pipe 159. The submerged launders 156 essentially comprise perforated tubes disposed within the clarifier below the level L of the liquid as best shown in FIGS. 14 and 15. Each tube 156 has two series of longitudinal rows of perforations 160 extending along the upper portion of the tube at an angular spacing from one another of approximately 60° with respect to the axis of the tube. The pipes 156 may be plastic and are shown in FIG. 15 supported by arcuate cradles 162 carried by T-shaped supports 164 which simply rest on the array of tube settlers 142'. Although not shown in FIG. 15, the members 164 may be perforated to allow water to flow therethrough.

It will of course be appreciated that this form of submerged launders has the benefit that ice can form on the surface of the liquid in the clarifier without interfering with operation of the launders. This arrangement also avoids the problem that scum might be carried into the launders; any scum which does collect can, in some cases, simply be allowed to remain on the surface of the liquid for periodic manual removal. Scum scraper mechanisms may be unnecessary; where they are required, mechanisms of the general form described with reference to FIG. 3 may be employed.

FIGS. 14 and 15 also illustrate the fact that, where submerged launders are used, it will be necessary to provide a somewhat different supporting arrangement for the tube settlers 142' because the supporting structure cannot be secured to the walls of the collecting chamber 32 as in the previous embodiment. For this reason, the longitudinal support beams 148' for the tube settlers 142' are supported solely by two columns 166; these beams in turn carry the tube settler support channel members 152'. Pipes 46' are suspended from the beams 148' by hangers 172.

In summary, the apparatus described above exhibits a number of significant advantages as compared with the prior art represented, for example, by U.S. Pat. No. 3,788,477. Amongst these are the fact that the need for a sludge scraper assembly is avoided with the consequent saving in capital cost and maintenance. Also, this facilitates operation of the apparatus in cold climates in which ice may form on the surface of the clarifier. The use of submerged launders as in the embodiment of FIGS. 13 to 15 is also desirable for this reason.

Figure 16:
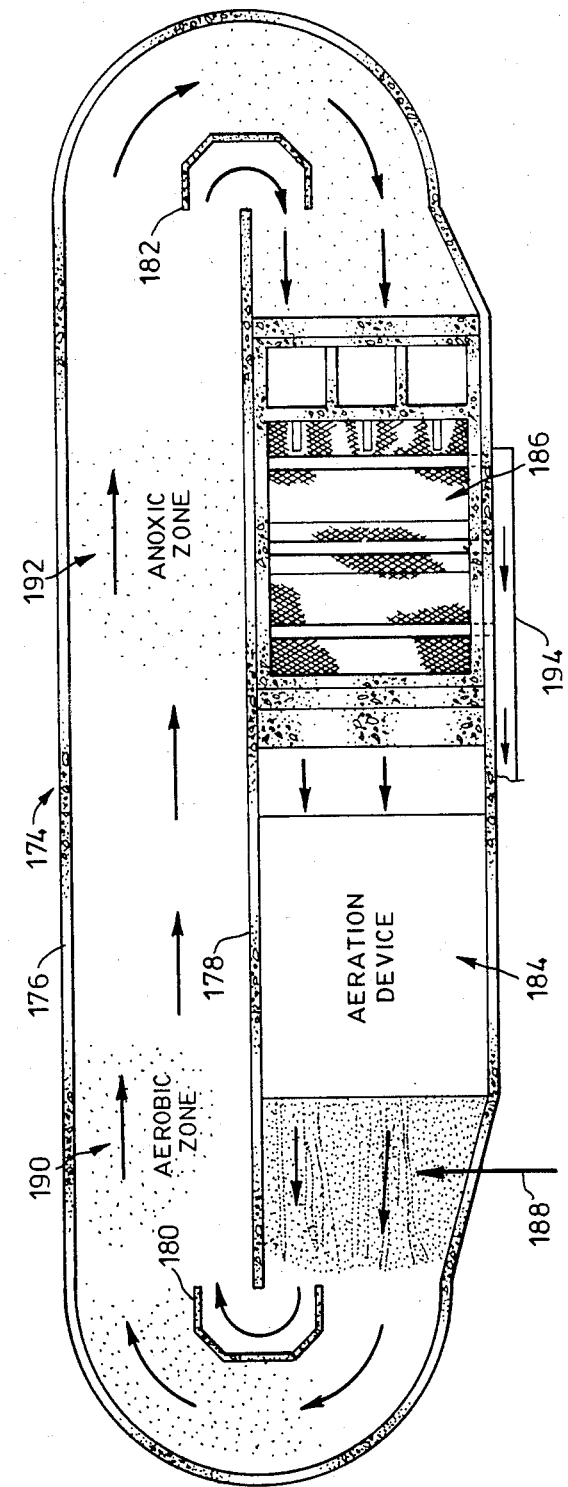
FIG. 16 is a diagrammatic plan view of an oxidation ditch in accordance with a further aspect of the present invention.

A further aspect of the invention involves the application of the integral clarifier concept in an oxidation ditch biological treatment system. FIGS. 16 to 18 illustrate an oxidation ditch activated sludge reactor in accordance with this aspect of the invention and will now be described.

FIG. 16 is a plan view and shows the general arrangement of the ditch. A concrete tank generally denoted 174 has an outer wall 176 and inner baffles 178, 180 and 182 which define a closed loop, open channel oxidation ditch. In the particular embodiment illustrated, the loop is relatively flat and elongate comprising two parallel straight sections connected by curved end sections; however, it should be noted that there is no limitation to this particular configuration. One of the straight sections incorporates an aeration device 184 and a clarifier 186. The aeration device circulates liquid in the loop in the direction indicated by the arrows. Immediately downstream of the aeration device waste water enters the oxidation ditch at the location indicated by arrow 188. Downstream of the waste water influent point, on the other straight section of the loop, is an aerobic zone 190 and anoxic zone 192.

The influent waste water to be treated becomes completely dispersed by the aeration device in the mass of mixed liquor (a mixture of biological solids (bacteria) and waste water) already in the ditch. As the mixed liquor travels around the ditch, biological purification takes place through the action of the micro-organisms (bacteria) feeding on the organic matter in the waste water. The aeration device 184 supplies oxygen (air) for this process to continue and the products of this reaction are purified waste water, additional micro-organisms and carbon dioxide gas. As the oxygen supplied by the aeration device is consumed, the reaction becomes anaerobic (anoxic zone 192). The micro-organisms then utilize the oxygen bound in the $NO_2$ and $NO_3$ compounds, releasing the $N_2$ to atmosphere as a gas. This is an accepted and effective method for removing nitrogen from waste water. In some cases, the presence of nitrogen in a treated waste water can be as objectionable as organic material.

Following the anoxic zone 192, the mixed liquor enters the clarifier 186. As will be described more specifically later, the clarifier is designed to provide a quiescent settling zone in which biological solids can settle from the mixed liquor. These biological solids are then returned to the main flow of mixed liquor around the ditch while clarified liquid is removed by way of a collection chamber 194 at the outer side of the wall of the oxidation ditch. Thus, the mixed liquor is continuously circulated through the clarifier and clarified liquid is removed from the system while the biological solids which settles out of the liquor is continuously returned directly to the main flow of mixed liquor travelling around the ditch. There is no need to employ syphons, sludge return pumps or other devices for recycling sludge from the clarifier back to the reaction basin of the ditch as in the prior art.

Referring now more specifically to FIGS. 17 and 18, it will be seen that the clarifier is defined at the upstream end (considered in the direction of circulation of liquor around the ditch) by a liquid collecting chamber 196 and, at the downstream end, by a partial wall 198 which extends across the ditch but which terminates well above the bottom wall of the ditch so as to leave a substantial opening 200 at the downstream end of the clarifier. The liquid collecting chamber 196 similarly extends from side to side of the oxidation ditch while terminating a substantial distance above the bottom wall of the ditch. Between chamber 196 and 198, a series of launders 202 extend transversely of the clarifier and communicate through the wall of the ditch with the treated water collection chamber 194. Immediately below the launders is an array of tube settler bundles generally denoted 204. As can be seen from FIGS. 16 and 17, the array is made up of an assembly of modular bundles generally as described in connection with the preceding embodiments. In view of the preceding description, structural details for supporting the launders 202 and tube settlers 204 have not been shown but may be substantially as previously described.

The water collecting chamber 196 is defined by inner and outer walls 206 and 208 (FIGS. 16 and 17) and is separated internally by walls 210 into three compartments. The collecting chamber extends downwardly below the tube settlers 204 as best seen in FIG. 18 and each compartment is provided with a water discharge pipe 212 which is directed generally horizontally in the direction of the main flow of liquor through the clarifier. This orientation of the pipes 212 is designed to provide for substantially laminar flow between the liquid issuing from these pipes in use and the main flow of liquor through the clarifier. This results in relatively low turbulence and the formation of a substantially quiescent settling zone immediately below the tube settlers in which biological solid particles can settle from the liquor while the clarified liquid travels upwardly to the launders, all generally as desribed previously in connection with the clarifier 20 of the first embodiment.

The outer wall 208 of the liquid collecting chamber 196 terminates at a level (denoted 214 in FIG. 18) which is below the normal liquid level L in the oxidation ditch. As best seen in FIG. 17, inwardly facing pairs of vertically oriented channel members are provided at the entrances to the compartments within chamber 196 for receiving stop logs which function in essentially the same manner as those described previously in connection with the first embodiment to control the flow of liquid into the compartments of the collecting chamber and to balance the flow between adjacent compartments.

In the illustrated embodiment, the floor of the oxidation ditch has a bottom wall 215 having a raised portion 216 below the clarifier for the purpose of providing some acceleration in the rate of flow of liquor through the clarifier.

In summary, mixed liquor which enters the clarifier from the anoxic zone 192 of the oxidation ditch will flow partly into the collecting chamber 196 and partly into the space below the chamber where the flow rate will be accelerated somewhat. The liquid which entered the collection chamber 196 will issue through the pipes 212 which will encourage laminar flow between that liquid and the main flow, forming a quiescent settling zone immediately below the tube settlers. In that zone, there will be a gentle upward flow of liquid towards the launders 202 while at the same time, sludge particles in that liquid will settle spontaneously by gravity and with the aid of the tube settlers 204 and will fall directly back into the main flow of liquid through the clarifier for resuming their biological action in the ditch. The liquid entering the launders 202 will form the main effluent from the ditch and will be conducted away from the treated water collection chamber 194 through a suitable level control box (not shown).

In the drawings, FIG. 16 shows the aeration device 184 merely in block form while FIGS. 17 and 18 illustrate a specific form of aeration device denoted 218 by way of example. This particular form of aeration device is known as a "draft tube and aerator drive" and is used in conventional oxidation ditch systems; accordingly, it will not be described in detail. For present purposes, it is sufficient to note that an impeller 220 driven from a motor 222 at the surface drives the liquid through a duct 224 from an intake 226 while air is introduced through a draft tube air sparge device 228 from a blower driven air supply 230. This form of aerator has been shown merely for illustration purposes; many other forms of aerator may be used within the broad scope of the invention.

It should also be noted that, although in the illustrated embodiment, the clarifier is shown as a separate concrete tank within the walls of aeration ditch, the clarifier may of course be incorporated directly into the ditch wall construction.

Amongst the many advantages of the various aspects of the invention (some of which have been indicated previously) is that the use of tube settlers makes for more efficient clarification as compared with a similar sized clarifier without tube settlers.

A still further advantage is that the liquid distribution arrangements allow for the required relatively gentle flow of liquid in the clarifier and avoid any problems of localized "boiling" of liquid which is detrimental to proper settling.

It is of course to be understood that the preceding description relates to particular preferred embodiments of the invention only and that various modifications are possible within the broad scope of the invention.

For example, as described briefly with reference to FIGS. 1 and 2, various alternative forms of mixer means can be employed in the reaction basin. Various features disclosed in U.S. Pat. No. 3,788,477 can also be used. For example, more than one clarifier could be used with a single reaction basin or, conversely, more than one reaction basin with a single clarifier as described in the patent. Also, the clarifier and reaction basin need not be rectangular. For example, the reaction basin could be circular and the clarifier arcuate as described in the patent. The clarifier and reaction basin need not be integrally combined in the same tank as described and illustrated in FIGS. 1 to 15. Also, the apparatus provided by the invention can be used in the performance of various chemical processes again as described in Pat. No. 3,788,477.

Finally, it should be noted that the term "solids contact aerobic biological treatment process" as used in this application includes but is not limited to conventional activated sludge processes, contact stabilization processes, extended aeration processes, and those biological processes involved in nutrient removal.

I claim:

1. A treatment apparatus comprising:
    a clarifier and a reaction basin in liquid communication with one another and together adapted to contain a body of liquid to be treated;
    inlet means for conducting influent liquid to said body;
    outlet means through which treated liquid can be removed from the clarifier, comprising a plurality of submerged launders disposed below the surface of the liquid in said clarifier and each comprising a tube having perforations through which liquid can flow into the interior of the tube, said tubes being coupled to a common outlet pipe;
    first and second means providing said liquid communication between the claifier and reaction basin, said first means being arranged to permit liquid and solids to flow from the clarifier into the reaction basin, and said second means being arranged to conduct liquid from the reaction basin to the clarifier and including at least one imperforate pipe having an inlet adjacent the surface of the liquid in the reaction basin and an outlet disposed at a location in the clarifier remote from the reaction basin and arranged to cause liquid leaving the outlet to flow through the clarifier towards the reaction basin to thereby flush settled solids into the reaction basin, said at least one pipe being capable of carrying a volume of liquid per unit time, which is substantially in excess of the overall volume whicn can be treated in the apparatus, in the same unit of time, whereby a vigorous flushing action is achieved;
    mixer means disposed in said reaction basin at a location remote from said first means providing liquid communication and adapted to circulate liquid in the reaction basin and through said clarifier by directing the liquid in a circulation pattern in which the liquid flows towards said at least one pipe for circulation of liquid through the clarifier.

2. An apparatus as claimed in claim 1 wherein said clarifier has a bottom wall which slopes downwardly from an upper end to a lower end for promoting movement towards said lower end of solids which have settled from said liquid in the clarifier, wherein said first means providing liquid communication between the clarifier and reaction basin is disposed at said lower end of the clarifier bottom wall, and wherein said second means comprises a plurality of said imperforate pipes extending through the clarifier from the reaction basin, the pipes being arranged with outlet ends thereof disposed in the region of said upper end of the clarifier bottom wall whereby liquid leaving said outlet flushes settled solids into reaction basin.

3. An apparatus as claimed in claim 1, wherein the clarifier and reaction basin together form an oxidation ditch defining a closed loop around which liquid is continuously circulated, the liquid flowing through the clarifier during such circulation by way of said first and second means providing liquid comnunication, and wherein said mixer means comprises an aeration device.

4. An apparatus as claimed in claim 1, further comprising an array of tube settlers covering substantially the entire surface of said clarifier below said liquid outlet means.

5. An apparatus as claimed in claim 4, wherein said array of tube settlers comprises an assembly of modular tube settler bundles each comprising a rectangular block of tubes.

6. An apparatus as claimed in claim 1, wherein said liquid outlet means comprises a series of liquid collecting launders at the surface of the liquid in the clarifier and defining the level of the said liquid.

7. An apparatus as claimed in claim 6, wherein said clarifier is a generally rectangular shape in plan and includes a clarified liquid collection chamber disposed substantially centrally of the length of the clarifier and extending transversely thereof, and wherein said launders extend longitudinally of the clarifier and are coupled to said collection chamber so that liquid collected by said launders is delivered to said chamber.

8. An apparatus as claimed in claim 7, further comprising, on each side of said collection chamber, a scum collection trough extending over substantially the entire length of said chamber, said trough being disposed slightly above the surface of the liquid in the clarifier and launders being connected to the collecting chamber below said troughs, and scum skimmer means adapted to collect scum from the surface of liquid in the clarifier and deliver said scum into said troughs.

9. An apparatus as claimed in claim 1, wherein said mixer means comprises a mechanical aerator disposed substantially centrally of the reaction basin and arranged to provide a said circulation pattern in which the liquid flows outwardly at the top of the basin from the mixer, downwardly at the sides of the basin, and then inwardly at the bottom of the basin.

10. An apparatus as claimed in claim 1, wherein said mixer means comprises a diffused air mixer system comprising diffusers submerged in the liquid in the reaction basin and air supply means adapted to deliver air to said diffusers, the diffusers being arranged in the reaction basin to provide the required liquid circulation pattern therein.

11. An aerobic biological reactor in the form of an oxidation ditch comprising:

a clarifier and a reaction basin in liquid communication with one another and together adapted to contain a body of liquid to be treated, the clarifier and reaction basin together defining a closed loop around which liquid can be continuously circulated with the liquid flowing through the clarifier during circulation;

inlet means for conducting influent liquid to said body;

outlet means through which treated liquid can be removed from the clarifier as the effluent from the reactor;

first and second means providing liquid communication between the clarifier and reaction basin, said first means being arranged to permit liquid and sludge to flow from the clarifier into the reaction basin and said second means being arranged to conduct liquid from the reaction basin to the clarifier and having an inlet adjacent the surface of the liquid and the reaction basin and an outlet defined by at least one pipe disposed so that liquid leaving the outlet directs settled solids into the clarifier in substantially non-turbulent flow relationship with respect to the liquid being circulated in said loop, whereby a substantially quiescent settling zone is defined in said clarifier for settling of biological solid particles; and, aeration means in said reaction basin adapted to aerate said liquid and cause said continuous circulation of liquid around the loop defined by the clarifier and reaction basin;

wherein the clarifier is defined by a wall extending across said loop at the downstream end of the clarifier considered in the direction of circulation of liquid around the loop, and by a liquid collecting chamber extending across the loop at the upstream end of the clarifier and from which extends said at least one pipe, said first means providing liquid communication being defined by an opening below said wall at the downstream end of the clarifier, and said second means providing liquid communication being defined by said liquid collecting chamber and at least one pipe, said liquid collecting chamber being arranged so that a portion of the liquid being circulated enters the chamber while the remainder flows through the clarifier in a main fluid flow, and said at least one pipe being oriented so that liquid leaving said pipe issues in laminar and substantially turbulence-free relationship with respect to said main liquid flow.

12. A reactor as claimed in claim 11, wherein said liquid collecting chamber defines a series of compartments disposed side by side across the clarifier with each compartment provided with one of said pipes, and wherein the reactor further comprises flow control means in each compartment adjustable to control liquid flow into the compartment from the reaction basin, thereby permitting control of liquid flow both into the collecting chamber and between compartments in said chamber.

13. A reactor as claimed in claim 11, further comprising an array of tube settlers covering substantially the entire area of the clarifier below said liquid outlet means.

14. A reactor as claimed in claim 13, wherein said array of tube settlers comprises an assembly of modular tube settler bundles each comprising a rectangular block of tubes.

15. A reactor as claimed in claim 11, wherein said liquid outlet means comprises a series of liquid collecting launders at the surface of the liquid in the clarifier and a treated water collection chamber to which said launders are coupled.

* * * * *